United States Patent [19]

Whitcomb

[11] Patent Number: 4,919,367
[45] Date of Patent: Apr. 24, 1990

[54] SATELLITE ATTITUDE CONTROL

[76] Inventor: Melville T. Whitcomb, 8 Glidden St., Waldoboro, Me. 04572

[21] Appl. No.: 162,074

[22] Filed: Feb. 29, 1988

[51] Int. Cl.⁵ .................................................. B64G 1/28
[52] U.S. Cl. ...................................... 244/164; 244/165
[58] Field of Search .......................... 244/164, 165, 169

[56] References Cited

U.S. PATENT DOCUMENTS 2,856,142 10/1958 Haviland .............................. 244/165

Primary Examiner—Joseph F. Peters, Jr.
Assistant Examiner—Rodney Corl

[57] ABSTRACT

Method and apparatus for controlling the attitude of a satellite in space by thruster reaction forces without loss of thruster fluid into space. A jet of gas, preferably compressed air, comprising reaction mass stored in a reservoir on board, is discharged in a predetermined direction into an endless enclosed evacuated volume. The molecules of discharged gas are scavenged from the volume and recompressed and restored to the reservoir. The discharged gas is scavenged sufficiently rapidly from the volume to prevent appreciable increase in the static pressure encountered by repeated bursts from the jets. The apparatus comprises an endless duct network circumferentially surrounding the two axes of the satellite, with solenoid operated thrusters selectively to discharge the gas jets and a vacuum-pressure pump to scavenge the air molecules, recompress them and pump them back into the reservoir tank.

11 Claims, 3 Drawing Sheets

SATELLITE ATTITUDE CONTROL

This invention related to attitude control of space craft of all kinds, including orbiting earth satellites, whether geosynchronous or low orbit. For convenience, hereinafter the term "satellite" will be used to designate generically any kind of space vehicle to which the invention may be effectively applied.

BACKGROUND OF THE INVENTION

Attitude control of satellites is conventionally achieved by discharge of reaction mass to surrounding space from thrusters oriented such that the reaction force from the discharge rotates the satellite in the desired direction. The motion is stopped by thrust in the opposite direction. The thrusters are controlled by either on-board computer or from the ground to achieve the desired result. Attitude control is, of course, very important to assure that cameras, antennas and other sensing devices on board, as well as sunshades, solar panels, etc., remain continuously aimed in the desired directions to perform their functions.

In accordance with the conventional prior art, a reservoir of suitable fluid in liquid form must be stored on board and launched with the satellite, thereby increasing its launch weight. During use, this reservoir is gradually exhausted. When the reaction mass has been used up, attitude control of the satellite is lost. Typical of this prior art are the National Oceanic and Atmospheric Administration's GOES satellites with their external thrusters.

Another prior art system is disclosed in U.S. Pat. No. 3,097,818 to Heller wherein a reservoir of water is stored on board the satellite. A circular conduit is provided which is divided into two semi-circular conduit sections by a pair of vapor generators. These may be selectively heated to generate steam and direct the vapor into one or the other section where, when it reaches the other generator, it is condensed back to water again. The vapor, travelling in a circular path, has a certain angular momentum. The angular momentum of the fluid in one direction results in the satellite acquiring angular momentum in the opposite direction, thus changing its attitude. The motion is stopped by causing vapor flow in the opposite sense. If the effect thus produced on the attitude of the vehicle is insufficient, reaction mass can be discharged into space from external thrusters to supplement the action of the internal system.

It is apparent that problems exist with the Heller system. In the first place, a substantial reservoir of water is needed which must be in the vehicle at launch, thus increasing its weight and correspondingly decreasing the available useful payload. For use, the water must be heated to the vapor state and recondensed after use. This leads to slow response and problems of overshoot as well as high demand for electrical power. Further, a system for use in space requiring storage, vaporization and condensation of water for its success must, of necessity, be complex mechanically and electrically, presenting physical problems to overcome effects of weightlessness, enormous temperature changes etc., with corresponding likelihood of failure. In a weightless environment, storage and flow of liquid present problems especially difficult to overcome. Because Heller provides only low reaction power with rapid saturation of his semi-circular conduit sections, errors in attitude correction tend to be cumulative, requiring reaction mass from time to time to be discharged into space through external thrusters to compensate for the inadequate initial thrust, whereby the reservoir is sooner exhausted.

A somewhat similar mass transfer arrangement is disclosed in the Miksch U.S. Pat. No. 3,091,417 which also employs reservoirs of liquid, water or alcohol, to be vaporized by heaters. He too contemplates loss of fluid through thrusters discharging to space when needed. Miksch also provides slow response with overshoot problems. Again errors are cumulative, external thrusters being required to compensate for the same. His heaters likewise have considerable demand for electricity. To the extent that Miksch transfers a mass of liquid, he might as well be shifting a mass of solid with attendant limitation on thrust effect and increased error accumulation.

With the foregoing in mind, it is the primary object of the invention to provide a novel method and apparatus for satellite attitude control employing the principle of conservation of angular momentum but requiring the use of only light-weight components and a reservoir of gas instead of liquid with no loss of reaction mass in use and immune to the above-described saturation effect and error accumulation.

SUMMARY OF THE INVENTION

In accordance with the invention, there is provided the method of controlling the attitude of a satellite in space by thruster reaction forces which comprises discharging from a reservoir of compressed gas at least one jet of reaction mass fluid in gaseous form into an endless enclosed evacuated volume on board the satellite, scavenging the molecules of discharged gas from said volume, and recompressing and restoring the same to the reservoir. The discharged gas is scavenged sufficiently rapidly from the volume to prevent appreciable increase in the static pressure encountered by repeated bursts from the jets. In a preferred method the reaction mass gas is compressed air.

The invention includes apparatus for controlling the attitude of a satellite in space by thruster jet reaction forces which comprises thrusters mounted to discharge in predetermined directions, a reservoir of thruster reaction mass in the form of compressed gas, conduits for conducting gas from the reservoir to the thrusters to be discharged therefrom in jet form, means for selectively activating the thrusters, means defining an endless enclosed volume of low static pressure into which the thrusters discharge their bursts, and means for scavenging the discharged gas from the volume and recompressing it for storage in the reservoir for re-use. The discharged gaseous molecules are withdrawn sufficiently rapidly to prevent deleterious increase in the static pressure encountered by the gaseous discharge from repeated bursts from the thrusters.

In preferred embodiments, the said reaction mass gas is compressed air; the means for scavenging the discharged fluid and restoring it to the reservoir comprises a vacuum pump with its inlet in communication with the enclosed volume and its outlet in communication with the gas reservoir; the means for selectively activating the thrusters comprise solenoid operated valves to control fluid flow from the conduits to each of the thrusters; the volume defining means comprises endless fluid conduit means into which the thrusters discharge their bursts in the desired direction and an outlet in communication with the inlet of the scavenging means for withdrawing discharged gas molecules therefrom.

A presently preferred system comprises interconnected first duct members defining a circumferential closed, endless volume about one axis of the satellite and interconnected second duct members defining a similar volume about the other axis of the satellite and interconnected with the first named ducts, thrusters mounted at the intersections of the duct members and discharging thruster gas in opposite directions within the ducts, a vacuum pump in communication with the ducts to withdraw therefrom discharged molecules of thruster gas, a reservoir of compressed thruster gas in the form of compressed air in communication with the output of the vacuum pump, conduits for conducting pressurized thruster gas from the reservoir to the thrusters, and solenoid operated valve means for controlling the operation of the thrusters.

Still further objects, advantages and features of the invention will become apparent from the following detailed description of presently preferred embodiments of the same taken in conjunction with the accompanying drawings in which similar numerals denote similar parts in the respective views.

DETAILED DESCRIPTION OF PREFERRED EMBODIMENT

Figure 1:
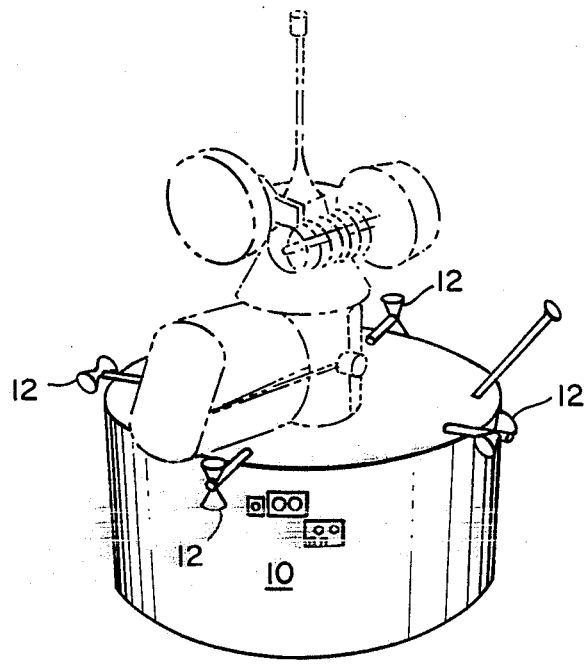
FIG. 1 is a somewhat diagrammatic view in perspective of a conventional satellite of the prior art showing its conventional external thrusters which provide its attitude control means.

Referring first to FIG. 1, illustrative of the prior art, the body 10 of a conventional satellite is shown. The various operational parts such as antennas, sunshades, etc., are shown in broken lines. They have not been shown in detail nor will they be described since they are not operationally involved in the attitude control system of prior art satellites, nor, indeed, of satellites employing the present invention. The prior art satellite shown has its attitude controlled by external thrusters 12 whose nozzles discharge bursts of reaction mass fluid into space in selected directions. An internal reservoir (not shown) with appropriate controls (not shown) supplies the thruster fluid to the thruster nozzles. The attitude of the satellite is thus controlled by appropriate bursts of reaction mass from selected nozzles as controlled by a computer (not shown) on board or on earth. It is apparent that when the reservoir has been emptied, attitude control has been lost. Typical of such satellites are the GOES weather satellites deployed by the National Oceanic and Atmospheric Administration.

Figure 3:
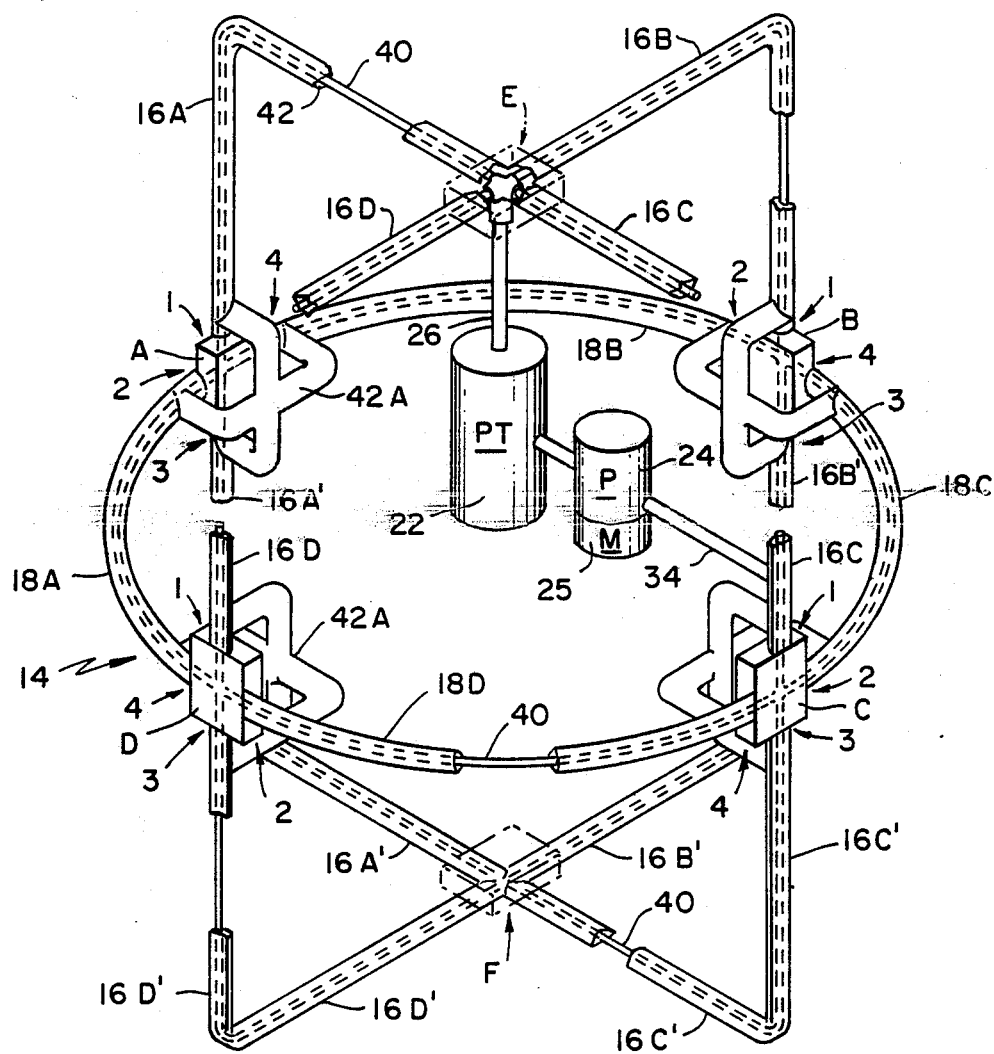
FIG. 3 is a view in perspective of the satellite attitude controlling system of the invention as it would be mounted within or on a satellite (not shown)

With the foregoing background information in mind, we now turn to FIG. 3 which displays the components of an attitude control system embodying the present invention. The system may be installed within the satellite (not shown) or the system may be part of a supporting framework about which the satellite may be constructed. For retrofitting, it may be mounted on the external skin of the satellite. The system is adapted for use with any kind of satellite and, consequently, the remainder of the satellite has not been illustrated in FIG. 3.

The components which comprise the assembled system 14 include hollow upper ducts 16A, 16B, 16C, 16D and hollow lower ducts 16A', 16B', 16C' and 16D'. The hollow ducts are interconnected to define an endless volume and their interiors together form a system 42 of interconnected fluid return ducts feeding into tube 34 which returns collected fluid to the intake of the vacuum pump 24 which is driven by motor 25 as explained in detail below. The ducts of the upper set and the ducts of the lower set have horizontal runs which cross at the top and bottom of the structure, respectively, and vertical runs which are positioned in a cylindrical array about the satellite axis and which jointly terminate in the control blocks A, B, C and D. Horizontal duct members 18A, 18B, 18C and 18D join the control boxes to each other and form a horizontal duct about the center of the structure which is bounded at each end by the intersecting radial portions of the other hollow ducts. All the ducts are in free communication with each other to define the system 42 which comprises a substantial volume of endless paths into which the thrusters may discharge their bursts as described below.

Figure 2:
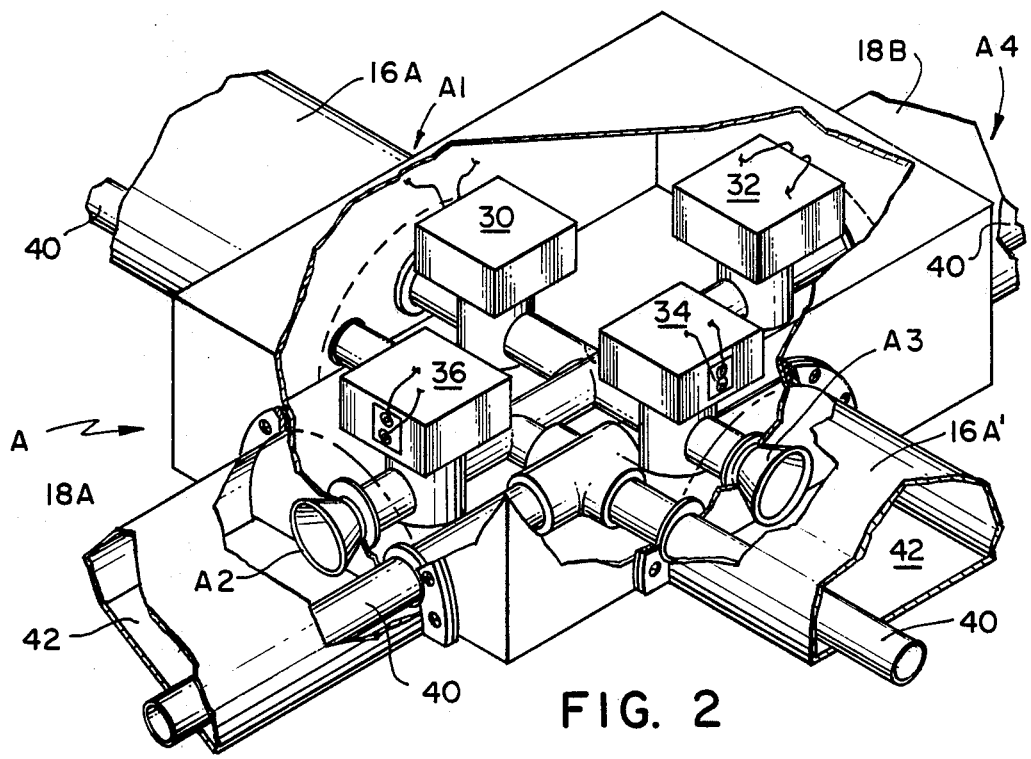
FIG. 2 is a view in perspective on a greatly enlarged scale with portions broken away of one form of control block containing solenoid operated valves for selectively activating the attitude controlling thruster nozzles in accordance with the invention.

As mentioned, at the junction points of the axially arranged duct runs with horizontal members 18A, 18B, 18C and 18D are located control blocks A, B, C and D containing solenoid valves for operating the four thruster nozzles 1, 2, 3, and 4 in each block as will be explained in connection with FIG. 2 illustrating the construction of block A which is representative of the construction of all the blocks. Optional additional blocks E and F, shown in phantom lines, can be located at the intersections with each other of the upper ducts 16A, 16B, 16C and 16D and of the lower ducts 16A', 16B', 16C' and 16D'.

In addition to defining duct system 42, the ducts optionally may be adapted to accommodate a high pressure conduit line 40 which may comprise interconnected internal passages within the ducts or a separate tube threaded within the passage. The conduit 40 need not be integral with or held within the ducts and, optionally, can comprise completely independent tubing. The ducts 42 may desirably be formed by bonding semi-circular members to the flat sides of solid structural members of the satellite or to the satellite skin. In any case, pressure conduit 40 is adapted to supply pressurized thruster gas to each of the control blocks A, B, C and D and is relatively small in internal diameter. The duct system 42, as the return line for salvaging gaseous molecules which have been discharged by the thruster nozzles, is relatively large in diameter.

Mounted within the satellite at any suitable location are a pressure tank 22 and a vacuum-pressure pump 24. The tank 22 is adapted to be filled with a compressed gas, such as air at a suitable working pressure, prior to launch. The pump is adapted to scavenge air molecules discharged by the thruster bursts into duct system 42 and pump the same back into tank 22, as will be described. By using compressed gas instead of a liquid, substantial saving in launch weight is achieved thereby increasing useful payload.

The tank 22 is placed in communication with high pressure line 40 within the duct system 42 through tube 26 and the inlet of the vacuum pump 24 is placed in communication with the outlet of duct system 42 through tube 34. The first mentioned conduits conduct the pressurized gas from tank 22 to the blocks A, B, C and D. The tank pressure, being some 100 psi (7.03 Kg/cm²) above the static pressure in the duct system 42, should be adequate for the purposes of the invention. Higher pressures, of course, can be used.

Each block controls four thruster nozzles 1, 2, 3 and 4 which discharge into the duct system. Referring to FIG. 2, which illustrates block A, each nozzle is controlled by a corresponding solenoid valve 30, 32, 34 or 36 which, when opened, selectively discharges bursts of pressurized gas, comprising reaction mass, from the high pressure conduit 40 into the larger volume defined by the duct system 42. The input to the valves may be a suitable manifold or comprise passages in the block. The output of each valve may be routed to its respective nozzle through channels drilled or cut into the block also as in a regular manifold. The tube 26 which feeds pressure conduit system 40 may comprise a small diameter pipe or plastic tube.

It is assumed, for purposes of carrying out the invention, that the satellite is provided with the usual source of electric power, either through batteries and solar panels or a nuclear generator, neither of which has been shown. The vacuum-pressure pump 24 is driven by electric motor 25 actuated by electricity from the satellite's power source.

The nozzles in each block are roughly the same as those used for rocket exhaust except for size and modification to improve the efficiency on pressurized gas. The valves are controlled by a computer (on board or ground based, not shown) and software to operate the selected nozzle(s), all as provided in present day conventional satellites.

Up to this point, everything is quite straightforward. The inventive difference is in the handling of the exhaust from the nozzles. Instead of allowing the reaction mass to discharge into and be dissipated in space as is usually done, the output of the nozzles is directed into the evacuated volume defined by endless closed duct system 42, from which it is scavenged by the vacuum-pressure pump 24 and returned to the tank 22 for re-use.

The actual shape and cross-section of the return ducts are not critical, but the volume should be such that the repetitive bursts from the nozzles will not raise the static pressure more than a small percentage before the action of the vacuum pump can restore it to a normal very low static pressure. Thus the saturation effect produced by the above-identified prior patents is avoided. The ducts should be integrally related, as shown, in order to make the full volume of the combined ducts available to all nozzles and to make it possible for the scavenging action of one vacuum pump to exhaust the whole system. This can be accomplished easily by the use of short interconnecting tubes 42A or holes drilled in the blocks mounted at the correct locations around the center of mass so the dynamics would not be changed. Likewise, the pressurized conduits must be appropriately connected together as seen in the interior of block A in FIG. 2 so as to supply compressed air to all the thruster blocks.

Figure 4:
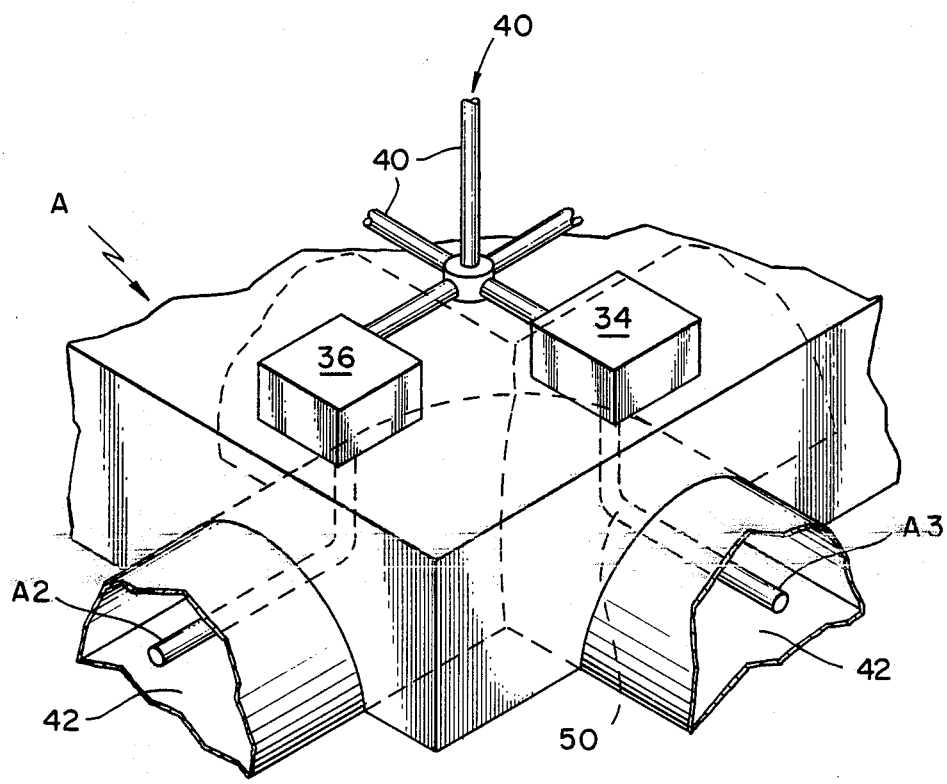
FIG. 4 is a somewhat schematic view similar to FIG. 2 of another form of control block mounted exteriorly of the duct system for controlling thrusters mounted within the duct system.

In order to provide reduced drag against gaseous flow in the duct system it may be desirable to employ the solenoid containing block systems shown in FIG. 4 in place of those shown in the other figures. In this case the solenoid valves and blocks are mounted externally of the duct system and the outlets of the valves communicate with the thrusters through suitable tubing 50. In this embodiment the thrusters and connecting tubing comprise the only obstructions to free gaseous flow in the tubing system.

THEORY OF OPERATION

Concern about the negative effect of reaction forces on the walls of the ducts is unwarranted. While it is true that any pressurized gas will expand to fill the volume of the tubes, the expansion of the gas will so reduce its pressure that the drag against the walls will be negligible. If the area of a ¼" orifice at the opening is 0.149 sq. in. (0.3165 sq. cm.) and the area of a 3' conduit is 7.065 sq. in. (45.58 sq. cm.), it is obvious the pressure of the gases at the walls of the conduit will be so low as to create negligible boundary-layer friction. Further, the boundary-layer effect is a function of the roughness of the surface of the material comprising the walls of the tubes. Duct material should be as smooth as practical. Also, because of the low velocity and pressure, the change in direction at the turns will cause little loss and can be solved, if deemed necessary, by vector analysis. (See: "Fluid Mechanics" 3rd ed. (1955) and "Advanced Fluid Dynamics and Fluid Machinery" (1951) by R. C. Binder).

The gas is free to flow throughout the tubes with no direct stop at the vacuum pump or at any other point, including the thruster control blocks. In the preferred embodiment of FIG. 4, the only obtrusions into the inside of the vacuum conduits are the thrusters themselves. As it is unlikely these thrusters would exceed 1" in cross section, they would offer little obstruction to the free flow of the attenuated gas inside the conduits. In addition, the "Venturi" effect of the fluid from the thrusters enhances the flow of the fluid already in the conduits. (It is believed that the flow of fluid within the conduits around the walls of the satellite creates an effect similar to that of the "Flywheel" effect being investigated for NASA at MIT.)

So far as the vacuum pump is concerned, unless the static pressure in the conduit system rises to the "turn-on" pressure of the pump, there is no gas-flow at all in the line from the conduit to the pump. Because the pump cycles independently of thruster firing sequence, it has little practical effect on the system. The conduits are equally spaced around the hull of the satellite, therefore, the exhaust gases are also equally dispersed throughout the system. The action of the vacuum pump causes all gases from the conduits to converge equally at the pump intake thus canceling any possible directional thrust from this motion. It should be kept in mind that the purpose of this invention is to control the roll, pitch and yaw of the satellite within a few degrees and not to spin it around like a pinwheel. Actually, it would take several attitude corrections before operation of the vacuum-pressure pump would be necessary. This, of course, depends upon the volume of the pressure tank, the pressure of the gas and the dimensions of the conduit system as well as the method of controlling the on-off cycle, whether self-operated by pressure switches or computer control.

It is well-known that one cannot cause part of a system to move in one direction with respect to the center of mass without another part of the system moving in the opposite direction. Such would be essentially a violation of the law of conservation of momentum. Correspondingly, it is true with respect to conservation of angular momentum whose law does not allow part of a system to rotate in one direction without an opposite rotation in another part of the system. In accordance with the present invention, the body of the satellite is allowed to rotate one way while the gas in the duct system rotates in the opposite sense. No suggestion of perpetual motion can arise because the system requires power to function. There would, therefore, appear to be no reason in principle why the system will not perform in the desired fashion.

A complete mathematical analysis of the system of the present invention has not been undertaken in view of statements of R. C. Binder in his treatise on "Fluid Mechanics" and "Advanced Fluid Dynamics and Fluid Machinery," "Many flow phenomena are so complicated that a purely mathematical solution is impossible, incomplete or impractical, and it is necessary to resort to experimental measurements." This is the method used by applicant for his first, and successful, investigation of the present system.

If a thruster nozzle is discharged into a near vacuum, such as into space, maximum acceleration of the gas and maximum reaction is imparted to the device on which the thruster is mounted. According to the invention, a similar result is achieved by discharging the thruster nozzle into an evacuated enclosed volume. If the volume were not evacuated, there would be a resulting decrease in the acceleration of the gases discharged from the nozzle and a reduction in the reaction imparted to the device upon which the thruster is mounted. If the volume became saturated, the device would be inoperative.

The operation of the system of the invention will now be described.

OPERATION

Referring to FIG. 3, of primary importance is the layout of the exhaust duct system and its relationship to the nozzles in each of the blocks. There must be an airtight seal between the output of the nozzles and the ducts. FIG. 3 shows the exhaust duct system 42 as formed from sections of pipe cut lengthwise and sealed to a duct or the satellite hull so that the hull serves as a closure for one side of the duct. The pressure conduit system 40 can be formed from tubes running within duct 42 or independently thereof. In a retro-fit system, the exhaust duct system 42 could be regular pipe with the nozzles sealed into one end and the other ends connected together, again, the pressurized system 40 can comprise interconnected tubes run within or outside the system 42. The vertical conduit system shows straight runs on either side of the long axis of the satellite. It may be preferable to provide a circular configuration for this portion of the system as well as the horizontal ductwork to provide less obstruction to free flow of the reactant mass molecules therein.

Some sample operating results follow:

Triggering nozzle 1 (block A) and nozzle 3 (block C) causes a tilt counter-clockwise.

Triggering nozzle 3 (block A) and nozzle 1 (block C) would stop the tilt motion and, if continued, cause a tilt clockwise.

Triggering corresponding nozzles in blocks B and D would do the same, only 90° from the previous example.

Triggering nozzles 4 of opposite blocks, or all four nozzles 4 would cause rotation one way while triggering opposite nozzles 2 or all nozzles 2 would stop that rotation and/or cause opposite rotation.

The acceleration per burst from the nozzles would be small, but the effect is cumulative, the reaction mass inexhaustible and the electrical supply more than adequate. In an elementary test mockup on earth, pressure differential of about 80 psi (5.54 $Kg/cm^2$) was used which performed very well but higher pressures would increase acceleration if needed.

While there has herein been disclosed and described a presently preferred embodiment of the invention, it will nevertheless be understood that the disclosure is intended to be by way of illustration and not limitation and the scope of the invention is to be measured only by the proper interpretation to be afforded the appended claims.

I claim:

1. The method of controlling the attitude of a satellite in space by thruster reaction forces which comprises discharging at least one jet of pressurized reaction mass gaseous fluid in a predetermined direction into an enclosed evacuated endless volume on board the satellite, scavenging the discharged fluid from said volume, and compressing and storing the scavenged fluid for re-use.

2. The method as claimed in claim 1, wherein the discharged fluid is scavenged sufficiently rapidly from said volume to prevent appreciable increase in the static pressure encountered by repeated bursts from said jets.

3. The method as claimed in claim 2, wherein said gaseous fluid is air.

4. A system for controlling the attitude of a satellite in space by thruster jet reaction forces which comprises thrusters mounted to discharge reaction mass gaseous fluid in predetermined directions.

a reservoir of pressurized reaction mass gaseous fluid, conduits for conducting gaseous fluid from said reservoir to said thrusters, means for selectively activating said thrusters, means defining an endless enclosed volume of low static pressure into which said thrusters discharge their bursts and through which said fluid can flow, and means for scavenging the discharged fluid from said volume and restoring it to said reservoir for re-use.

5. The system as claimed in claim 4 wherein said scavenging means is adapted to withdraw the discharged gaseous fluid from said volume sufficiently rapidly to prevent deleterious increase in the static pressure encountered by the fluid discharged by repeated bursts from said thrusters.

6. The system as claimed in claim 4 wherein said gaseous fluid is air.

7. The system as claimed in claim 4 wherein said means for scavenging the discharged fluid and restoring it to said reservoir comprises a pressure-vacuum pump with its inlet in communication with said volume and its outlet in communication with said reservoir.

8. The system as claimed in claim 4 wherein said means for selectively activating said thrusters comprises solenoid operated valves to control gaseous flow from said conduits to each of said thrusters.

9. The system as claimed in claim 4 wherein said volume-defining means comprises an endless duct system having a fluid receiving section coaxial with and communicating with the outlet of each thruster for receiving the bursts therefrom and an outlet in communication with the inlet of said scavenging means.

10. A system for controlling the attitude of a satellite by thruster jet reaction forces which comprises a reservoir of pressurized gaseous thruster fluid, interconnected first duct members providing a continuous run in a vertical plane about the periphery of said satellite, interconnected second duct members providing a continuous run in a horizontal plane about the periphery of the satellite and interconnected with said first named duct members, thrusters mounted within said runs for discharging bursts of thruster gaseous fluid within said duct members to provide a moving mass having angular momentum in one direction thereby to impart angular momentum to said satellite in the opposite direction, a pressure-vacuum pump with its inlet in communication with said runs to withdraw therefrom discharged thruster gaseous fluid and its outlet in communication with said reservoir, conduits for conducting pressurized thruster fluid from said reservoir to said thrusters, and solenoid operated valve means for controlling the operation of said thrusters.

11. The system of claim 10 wherein said runs are equally spaced around the hull of the satellite to permit said gaseous fluid to disperse equally throughout the system whereby the action of said pump causes all gases from said runs to converge equally at said inlet thereby canceling any possible directional thrust from said withdrawal action and wherein said pump is adapted to cycle independently of the operation of said thrusters.

* * * * *